Aug. 16, 1932.  W. C. TREGONING  1,871,635
MOLDED HOLLOW INSULATING ARTICLE
Filed May 7, 1928
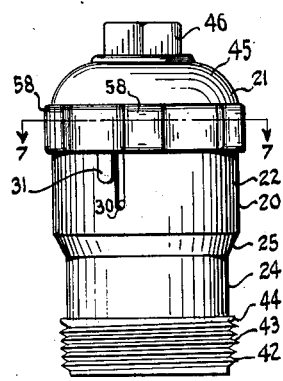
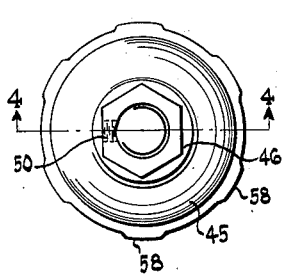
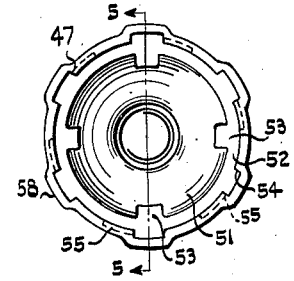
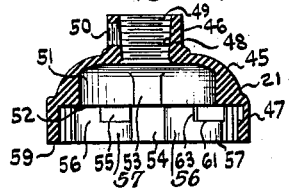
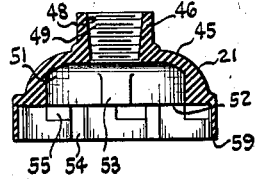
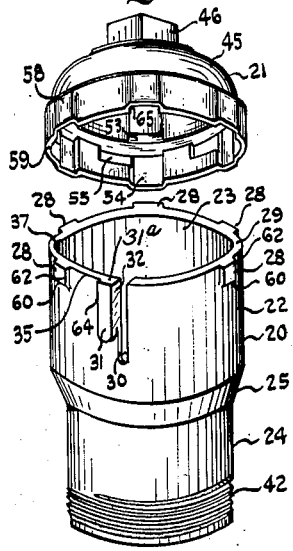
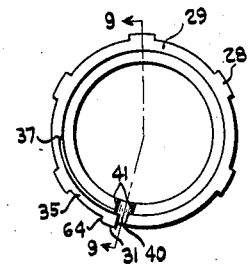
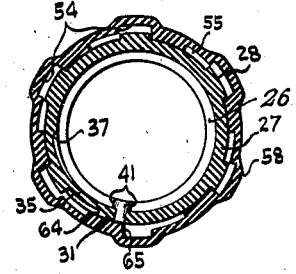
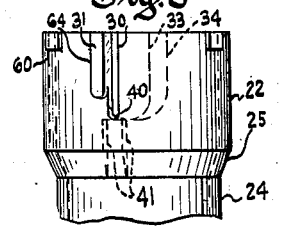
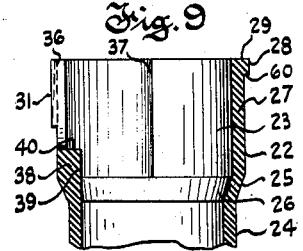
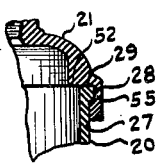
INVENTOR
William C. Tregoning
BY
Frank Hubbard
ATTORNEY Patented Aug. 16, 1932

1,871,635

UNITED STATES PATENT OFFICE

WILLIAM C. TREGONING, OF WAUWAUTOSA, WISCONSIN, ASSIGNOR, BY MESNE ASSIGNMENTS, TO CUTLER-HAMMER, INC., A CORPORATION OF DELAWARE

MOLDED HOLLOW INSULATING ARTICLE

Application filed May 7, 1928. Serial No. 275,768.

This invention relates to improvements in molded articles and methods of and apparatus for molding the same. More particularly the invention relates to molded lamp socket casings of insulating material although as will appear various other articles comprising separable parts may be advantageously formed of the desired material, in accordance with the invention.

An object of the invention is to provide an insulation article composed of separable parts having cooperating elements integral therewith to effect positive interlocking engagement therebetween.

Another object is to provide an article comprising separately molded insulating cap and body portions having elements molded integrally therewith respectively to provide a snap catch therebetween for assembly thereof.

Another and more specific object is to provide an all-insulation lamp socket casing or the like comprising separately molded cap and body portions having cooperating elements molded integrally therewith respectively to provide a snap catch therebetween for assembly thereof in substantially any rotary relation of said cap and body portions.

Another object is to provide an insulation article of the aforementioned character the parts of which may each be produced by a simple molding operation.

Another object is to provide novel methods of and apparatus for molding insulation articles of the aforementioned character, or parts thereof.

Other objects and advantages of the invention will hereinafter appear.

The accompanying drawing illustrates certain embodiments of the invention, which will now be described, it being understood that the invention is susceptible of embodiment in other forms without departing from scope of the appended claims.

In the drawing, Figure 1 is a side elevation of a lamp socket casing comprising body and cap members formed entirely of insulating material in accordance with my invention, the cap and body members being shown in telescoped relation, but prior to relative rotary locking movement thereof.

Figs. 2 and 3 are top and bottom plan views, respectively, of the cap member illustrated in Fig. 1.

Figs. 4 and 5 are vertical sections through the cap member, on the lines 4—4 and 5—5 of Figs. 2 and 3, respectively.

Fig. 6 is a top plan view of the body member shown in Fig. 1.

Fig. 7 is a horizontal section on the line 7—7 of Fig. 1.

Fig. 8 is a fragmentary view, in front elevation, of the body member of the casing.

Fig. 9 is a fragmentary view, in vertical section, on the line 9—9 of Fig. 6.

Fig. 10 is a fragmentary vertical section showing a part of the interlocking connection between the cap and body members.

Fig. 11 is a perspective view of the cap and body members of the casing in separated relation.

Referring to the drawing, the numerals 20 and 21 designate the body and cap members, respectively, of a lamp socket casing. Each of said cap and body members is formed entirely of a suitable insulating material, preferably of a slightly resilient or slightly flexible character, such as the phenol-formaldehyde condensation product sold under the trade name of "bakelite." Each of said members is also formed from the insulating material by a single molding operation, as hereinafter more fully described.

As shown the body member 20 comprises an upper portion 22 having a bore or cavity 23 adapted to receive the parts of the lamp socket and terminals to be enclosed in the casing, said member also having an integral lower portion 24 of reduced external diameter and of smaller internal diameter to accommodate the usual metallic screw shell terminal of the lamp socket. Said upper and lower portions are united by an integral beveled portion 25 forming an internal annular shoulder 26 to properly position the lamp socket parts longitudinally of the casing.

It will be noted that the external dimensions of the body portion 20 are substantially proportional to the dimensions of the bore thereof, thus providing a casing wall 27 of substantially the same thickness throughout the length of the body portion; whereas by molding the casing parts of "bakelite" or similar tough but relatively rigid insulating material such wall may be made relatively thin to provide a neat and attractive appearance of the casing, while also providing for a minimum weight thereof with resulting economy in the use of the insulating material.

Peripherally arranged at the upper end of the member 20 are a plurality of integrally molded projections 28, said projections having their upper edges arranged flush with the upper edge 29 of said member 20 and extending downwardly a predetermined distance from said edge 29. The member 20 is provided with a notch or slit 30 extending downwardly a predetermined distance from the upper edge thereof, and also molded integrally with the member 20 is a projection 31. The upper end of projection 31 is likewise flush with the upper edge of member 20, and one side 32 of said projection 31 is preferably flush with one side of the notch 30.

As shown the projections 28 are spaced sixty degrees apart, with the exception of the two projections 28 on opposite sides, respectively, of the slit 30; said last mentioned projections being spaced one hundred and twenty degrees apart. The member 20 is provided with the relatively narrow slit 30 when the casing is intended to receive parts to provide a keyless lamp socket, and it will be apparent from Fig. 11, for instance, that another projection of the character illustrated at 28 might be molded integrally with the member 20 and located slightly to the right hand side of slit 30.

However, as illustrated in Fig. 8, it is contemplated that the casing herein disclosed shall be capable of alternative use for the reception of parts providing a key lamp socket or a pull chain lamp socket; the slit 30 (Fig. 8) being enlarged as shown in dotted lines at 33 to provide for accommodation of key socket parts or mechanism, and said slit being further enlarged as shown in dotted lines at 34 to accommodate pull chain socket mechanism.

Such enlargements 33 or 34 of the slit 30 may be provided by employment of different molding dies or by the attachment of different parts to the same die to provide slots of the desired shape and size, or the members 20 may be molded as shown in full lines in the various figures, and the insulating material then cut away or punched out to provide the notches illustrated at 33 or 34 (Fig. 8).

For the foregoing reasons a sixth projection of the type illustrated at 28 is preferably omitted. Moreover, it will be understood that the number of projections corresponding to 28 may be increased or decreased as desired, except that a symmetrical arrangement (as defined herein) of such projections must be provided.

As shown the projection 31 extends downwardly considerably farther than the projections 28 and preferably about three or four times as far as the latter, said projection 31 being depressible manually or otherwise, through flexure of a relatively thin region 35 of the wall, to provide for separation of the body portion 20 from the cap 21 after the interlocking connection therebetween has been effected, as hereinafter described.

The projection 31 also preferably extends radially outward slightly farther than the projections 28, and depression of the former is similarly required to effect initial telescopic relative movement of the body and cap members 20 and 21 during assembly thereof, whereas if desired the upper edge of projection 31 may be slightly beveled (as indicated in dotted lines at 36 in Fig. 9) to automatically effect depression of said projection during initial telescoping movement of said cap and body members.

As best shown in Figs. 6, 7 and 9 the thickness of the wall of the upper portion 22 of body member 20 is reduced interiorly thereof from the point indicated at 37 to that side of the slot 30 upon which projection 31 is located. Such reduced wall thickness extends downwardly to the internal shoulder 26 (Fig. 9); but it will be understood that a larger or smaller area of the wall may be formed of reduced thickness to provide the desired or required degree of flexibility thereof for the purpose aforementioned.

Body member 20 is preferably provided with an internal projection 38 having its inner surface 39 flush with the bore of the lower portion 24 of said member and having its flat upper surface 40 flush with the lower end of the slit 30 (Fig. 9). Said projection 38 is also provided with oppositely arranged vertical shoulders 41 (Figs. 7 and 8) for cooperation with a suitable notch in the socket parts (not shown) to insure against rotation of the latter with respect to the casing.

The body member 20 is preferably molded with its lower portion 24 of the same external dimensions throughout its length, thus providing for molding of the piece between dies of the usual type which are relatively movable unidirectionally, the usual external thread 42 being formed therein by well known means to provide for attachment of a correspondingly threaded shade holder of a well known type.

Moreover, if a shade holder of the spring ring or similar type is to be employed I preferably provide an internally threaded metallic ring, such as indicated at 43, to cooperate with the thread 42, said ring 43 having an annular flange or shoulder 44 to accommodate the last mentioned type of shade holder.

The cap 21 as aforeindicated is composed of a single molded piece of insulating material, and the same comprises essentially the substantially bell-shaped portion 45, the integrally molded insulating collar or bushing 46, and the bayonet grooved portion 47 at the lower end thereof to provide for interlocking engagement thereof with the body portion 20 aforedescribed. The bushing 46 is preferably provided with a bore 48 by the molding operation, and a thread 49 may thereafter be cut in said bore to receive a correspondingly threaded end of a conduit or the like of an electrical fixture, or said thread 49 may be formed in the bushing 46 by the molding operation. Bushing 46 may also be drilled and tapped as indicated at 50 to receive a locking set screw (not shown).

Cap 21 is internally hollowed as indicated at 51 to accommodate the usual conducting wires and terminals of the lamp socket, and also to minimize the amount of insulating material employed in forming the cap. Said cap is also provided with a horizontal substantially annular ledge or shoulder 52 adapted to engage the upper edge 29 of body member 20 when the parts are in assembled relation.

A plurality of radially arranged inward projections 53 are also preferably provided to strengthen the cap and also to engage the upper end of the electrical device which is fitted into the body member 20, to insure against longitudinal movement of such device with respect to the casing.

A shown the cap is provided with six bayonet grooves or slots arranged symmetrically around the inner surface of the lower portion 47 thereof. Each of these grooves comprises a branch 54 extending vertically from the lower edge of the cap to the annular shoulder 52 and a horizontal branch 55 extending from the upper end of said first mentioned branch and opening thereinto. The dimensions and arc of radial curvature of the respective branches 55 of the bayonet grooves are substantially the same as but slightly greater than the corresponding dimensions and curvature of the projections 28 to provide for movement of the latter into engagement with the former.

Similarly the width of the branches 54 is substantially the same as the width of branches 55, but the height of the former is preferably about twice as great as the height of the latter. It is to be understood, however, that the dimensions and relative position of the branches 55 might be changed, provided the dimensions and position of the projections 28 on member 20 were correspondingly changed.

With the arrangement aforedescribed the inner surface of the portion 47 of the cap consists alternately of bayonet grooves 54, 55 and intermediate raised or shouldered portions 56, 57. The cap 21 is also preferably provided with slightly bulged or projecting portions 58 to compensate for the difference in thickness of the wall necessitated by the presence of the branches 54 of the bayonet slots. It will be noted, however, that the branches 55 of said grooves are not so deep (that is, they do not extend radially outward to the same extent) as the branches 54, and hence the normal thickness of the wall or portion 47 of the cap will readily accommodate the branches 55 without necessitating an increase in thickness of the cap at these points.

The cap and body members of the casing may be assembled as follows, referring more particularly to the perspective view of Fig. 11: Thus the parts are initially brought together in such manner that any five of the branches 54 of the bayonet grooves are in alinement with the respective projections 28. Under these conditions, however, the upper surface 31a of projection 31 on body member 20 will be in engagement with the lower edge 59 of cap member 21, and hence the projection 31 must be depressed slightly to clear said edge 59. This depressing operation of projection 31 may be effected manually or otherwise as aforeindicated, and is facilitated by the reduced thickness of the wall of member 20 at the region indicated at 35, which is more flexible than the other portions of such wall.

Such flexure of the region 35 of the wall, moreover, places the latter under strain, but permits telescopic relative movement of the cap and body members until the projections 28 in traversing the branches 54 of the grooves reach the ledge or shoulder 52, at which time the projections 28 are in alinement with the branches 55 of the grooves and the former may be moved into the latter by partial rotation of the cap and body members relatively to each other in a clockwise direction. This relative movement of the cap and body members brings the lower edges 60 of the projections 28 into engagement with the shoulders 61 respectively of portions 57 whereby said cap and body members are held against relative longitudinal movement. Similarly the side edges 62 of the respective projections 28 are brought into engagement with vertical shoulders 63 of portions 56 whereby further relative rotary movement of the parts in the same direction is prevented.

At the same time such relative movement of the cap and body members causes the side edge 64 of projection 31 to come into alinement with a shoulder 65 forming a side edge of the vertical branch 54 of one of the bayonet grooves, and the projection 31 therefore snaps into engagement with said shoulder to prevent relative rotary movement of the cap and body members in the reverse direction. The cap and body members are thus positively locked against relative movement thereof in any direction, whereas such interlocking connection is provided by simple means formed integrally with the respective insulating members.

Separation of the cap and body members may be effected by temporarily depressing the projection 31 until the edge 64 thereof clears the aforementioned shoulder 65 of branch 54 of the slot, whereupon the cap and body members may be partially rotated relatively to each other to bring the several projections 28 into alinement with the corresponding vertical branches 54 of the slots. The cap and body members may then be separated from each other by a straight pull or reverse telescopic movement thereof.

In my copending application, Serial No. 492,166, filed October 30, 1930, which is a division of this application, I have described and claimed a method of and apparatus for molding an insulation article having a bayonet groove or the like in a surface thereof.

It will be apparent to those skilled in the art that if desired the bayonet grooves might be formed on the body member of the article with cooperating projections on the cap member. Also it will be apparent that if desired the cap member might be arranged to telescope into the body member, but ordinarily the internal space requirements of the casing render such an arrangement undesirable.

While I have shown my invention as applied to a lamp socket casing comprising insulating cap and body members, it will be understood that the invention is equally applicable to other types of insulating casings, such as pendent switch casings or the like formed of insulating material.

Similarly it will be understood that my novel joint or connection is applicable to many articles of plastic composition other than that herein specifically described, wherein it is desired to lock a plurality of separable parts against relative rotary and longitudinal movement, provided only that the composition material employed be of slightly resilient or flexible character.

Where no part of the electrical means is required to extend outwardly beyond the wall of the insulating casing (as where a keyless lamp socket is to be provided), such wall may be made annularly continuous interiorly of the casing, and that portion of the wall which supports the projection 31 may be molded integrally with the body portion of the casing but spaced slightly from the inner continuous portion of the wall, whereby a relatively tight joint is provided between the cap and body members, the other details of the structure being the same as aforedescribed.

What I claim as new and desire to secure by Letters Patent is:

1. An electric lamp socket casing comprising separately molded cap and shell members of insulating material, one of said members having a flexible portion formed integrally therewith, and said members respectively having cooperating shoulders formed integrally therewith, one of said shoulders being carried by said flexible portion to provide a snap catch between said cap and shell members upon assembly thereof.

2. A casing for electric lamp sockets, said casing comprising separately molded cap and shell members of insulating material, one of said insulating members having a plurality of bayonet grooves formed therein, the other of said insulating members having projections formed integrally therewith for cooperation with said grooves to provide for assembly of said members by sequential telescopic movement and partial relative rotation thereof, said last mentioned member having a flexible portion formed integrally therewith and an additional projection formed integrally with said flexible portion and movable relatively to said first mentioned projections, said last mentioned projection acting to latch said members against relative rotation upon complete assembly thereof.

3. As an article of manufacture, a hollow body comprising separately molded cap and shell members of insulating material, one of said insulating members having a plurality of projections integral therewith and a flexible portion carrying one of said projections, and the other of said insulating members having a plurality of substantially L-shaped grooves formed therein to receive said projections, said projections and said grooves cooperating jointly upon assembly of said members to positively prevent both relative rotary and longitudinal movements of the latter.

4. As an article of manufacture, a hollow insulating body comprising two separately molded parts, one of said parts having a plurality of peripherally arranged integral projections adjacent one edge thereof, the other of said parts having a plurality of substantially L-shaped grooves formed in the inner surface thereof and opening onto the lower edge thereof, said projections being adapted to cooperate with said grooves in substantially any rotary relation of said parts to permit a predetermined amount of telescoping movement of the latter toward each other, said parts being thereafter adapted for relative rotary movement to latch the same against telescoping movement in the reverse direction, said first mentioned part having a flexible portion and having on said portion an additional integral projection adapted upon such relative rotary movement to snap into one of the grooves in the second mentioned part to thereby latch said parts in assembled relation.

5. As an article of manufacture, a hollow insulating body comprising two separately molded parts, one of said parts having a plurality of peripherally arranged integral projections adjacent one edge thereof, the other of said parts having a plurality of substantially L-shaped grooves formed in the inner surface thereof and opening onto the lower edge thereof, said projections being adapted to cooperate with said grooves in substantially any rotary relation of said parts to permit a predetermined amount of telescoping movement of the latter toward each other, said parts being thereafter adapted for relative rotary movement to latch the same against telescoping movement in the reverse direction, said first mentioned part having a flexible portion and having on said portion an additional integral projection adapted upon such relative rotary movement to snap into one of the grooves in the second mentioned part to thereby latch said parts in assembled relation, said last mentioned projection being depressible out of engagement with said groove to permit separation of said parts.

6. A locking joint for insulating members consisting of a hollow insulating body member and an insulating cap member, said cap member having a plurality of equally spaced substantially L-shaped notches in the inner wall thereof, the open ends of said notches being flush with the lower edge of said cap, said body member having a plurality of equally spaced integral lateral projections adjacent to the upper edge thereof, said projections being adapted to jointly register with a corresponding group of notches in said cap member whereby said members may be joined by sequential telescopic movement and partial relative rotation thereof, means providing for flexure of a portion of said body member and a lateral projection on said portion of said body member unequally spaced from said first mentioned projections and adapted upon such partial relative rotation of said members to snap into engagement with a shoulder of one of said notches whereby said members are latched against relative rotation.

7. A locking joint for insulating members consisting of a hollow insulating body member and an insulating cap member, said cap member having a plurality of equally spaced substantially L-shaped notches in the inner wall thereof, the open ends of said notches being flush with the lower edge of said cap, said body member having a plurality of equally spaced integral lateral projections adjacent to the upper edge thereof, said projections being adapted to jointly register with a corresponding group of notches in said cap member whereby said members may be joined by sequential telescopic movement and partial relative rotation thereof, and another lateral projection on said body member unequally spaced from said first mentioned projections and adapted upon such partial relative rotation of said members to snap into engagement with a shoulder of one of said notches whereby said members are locked against relative rotation, the wall of said insulating body member being slightly flexible at a point adjacent to said last mentioned projection whereby the latter may be forcibly disengaged from said shoulder to permit separation of said members.

8. A hollow receptacle comprising independent cap and body members each formed of insulating material, and latching means for securing the same to each other in substantially any relative rotary position of the parts and serving to hold the same together against endwise separation and relative rotary displacement, said latching means comprising interfitting insulating portions integral with the respective cap and body members and adapted for positive interlocking engagement with each other through sequential telescopic and partial relative rotary movement thereof, and certain of said insulating portions being formed to require yielding movement thereof for effecting such interlocking engagement, the associated member being flexible to provide for such movement.

9. A hollow receptacle comprising separable cap and body members each formed of insulating material, and latching means for securing said members to each other in any one of a plurality of relative rotary positions thereof and serving to hold the same together against endwise separation and relative rotary displacement, said latching means comprising multiple interfitting insulating portions integral with the cap and body members respectively and adapted for positive interlocking engagement with each other, one of said members being flexible, and one of said insulating portions being formed to require yielding movement of said one of said members for effecting such interlocking engagement.

10. An electric lamp socket or the like compromising a casing having independent cap and body members of insulating material, and latching means for securing the same together in substantially any relative rotary position of the parts and serving to hold the same together against endwise separation and relatively rotary displacement, said latching means comprising insulating portions integral with the respective cap and body members and adapted for positive interlocking engagement with each other, and one of said insulating portions being formed to require yielding movement thereof for effecting such interlocking engagement, the associated member being flexible to provide for such movement.

11. As an article of manufacture, a cap for lamp socket casings formed entirely of insulating material, said cap having an intermediate substantially bell-shaped portion and an interiorly threaded insulating bushing integral with said bell-shaped portion, and a skirt portion integral with said bell-shaped portion and having a multiplicity of grooves formed therein, said bell-shaped portion having a plurality of inward projections integral therewith and adapted for engagement by a suitable tool to facilitate attachment of said bushing to the threaded end of a conduit.

12. A casing for electric lamp sockets, said casing comprising separately molded cap and shell members of insulating material, one of said insulating members having a plurality of circumferentially arranged bayonet grooves formed therein, the other of said insulating members having circumferentially spaced projections formed integrally therewith for cooperation with said grooves to provide for assembly of said members by sequential telescopic movement and partial relative rotation thereof, and means associated with said shell member to positively and releasably latch said members jointly against relative rotation upon complete assembly thereof.

13. As an article of manufacture, a hollow insulating and enclosing casing for electric lamp sockets, said casing comprising separately molded insulating cap and shell members, one of said members having a plurality of circumferentially spaced integral projections adjacent to one edge thereof, the other of said members having a plurality of substantially L-shaped grooves formed circumferentially in one surface and opening onto an edge thereof, said projections being adapted to cooperate with said grooves in substantially any rotary relation of said members to permit a predetermined amount of telescoping movement of the latter toward each other, said members being thereafter adapted for relative rotary movement to latch the same against telescopic movement in the reverse direction, and means associated with one of said members and adapted upon such relative rotary movement to snap into engagement with a vertical shoulder formed on the other member to thereby positively and releasably latch said members against reverse rotation.

In witness whereof, I have hereunto subscribed my name.

WILLIAM C. TREGONING.